US009777885B2

(12) United States Patent
Lin (10) Patent No.: US 9,777,885 B2
(45) Date of Patent: Oct. 3, 2017

(54) SUPPORT DEVICE (71) Applicant: HON HAI PRECISION INDUSTRY CO., LTD., New Taipei (TW)

(72) Inventor: Chia-Shih Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 114 days.

(21) Appl. No.: 14/499,482

(22) Filed: Sep. 29, 2014

(65) Prior Publication Data

US 2015/0090852 A1  Apr. 2, 2015

(30) Foreign Application Priority Data

Sep. 30, 2013 (TW) .............................. 102135284 A (51) Int. Cl.
*E04G 3/00* (2006.01)
*F16M 11/10* (2006.01)
*F16M 11/04* (2006.01)
*F16M 11/18* (2006.01)
*F16M 13/00* (2006.01)
*F16M 13/02* (2006.01)

(52) U.S. Cl.
CPC .......... *F16M 11/10* (2013.01); *F16M 11/046* (2013.01); *F16M 11/18* (2013.01); *F16M 13/00* (2013.01); *F16M 13/02* (2013.01)

(58) Field of Classification Search
CPC .. F16M 2200/024; F16M 11/10; F16M 11/18; F16M 13/02; F16M 11/046; B60R 2011/0085

USPC .......... 248/292.12, 921, 922, 923, 371, 918, 248/157, 422, 423; 361/679.55, 679.56
See application file for complete search history.

(56) References Cited

U.S. PATENT DOCUMENTS

| 2,221,445 A | * | 11/1940 | Ehret ..................... F16M 11/18 |
| | | | 126/39 L |
| 2,588,054 A | * | 3/1952 | Smith ..................... G03B 19/04 |
| | | | 396/388 |
| 2,696,610 A | * | 12/1954 | Turley ..................... G01S 7/02 |
| | | | 116/278 |
| 5,039,240 A | * | 8/1991 | Hasegawa ................ B41J 35/20 |
| | | | 400/212 |

(Continued)

FOREIGN PATENT DOCUMENTS

CN  100426044 C  10/2008
CN  201352327 Y  11/2009
(Continued)

*Primary Examiner* — Kimberly Wood
(74) *Attorney, Agent, or Firm* — Steven Reiss (57) ABSTRACT A support device is configured to receive an electronic device. The support device includes a base, a holder rotatably mounted to the base, a semi-gear engaged with the holder, an eccentric gear including an shaft inserted into the holder, a wheel module selectively to drive one of the semi-gear and the eccentric gear to rotate, and a rotating module fixed to the wheel module; when the rotating module is rotated in a first direction, the wheel module drives the semi-gear to rotate, so as to make the holder to move up and down with respect to the base; when the rotating module is rotated in a second direction reversed to the first direction, the wheel module drive the eccentric gear to rotate, so as to drive the holder to rotate with respect to the base to adjust an angle between the holder and the base.

16 Claims, 13 Drawing Sheets

(56) References Cited

U.S. PATENT DOCUMENTS

| | | | |
|---|---|---|---|
| RE35,328 E * | 9/1996 | Kim | G11B 15/67549 360/85 |
| 5,805,310 A * | 9/1998 | Jean | H04N 1/00567 271/10.04 |
| 6,012,503 A * | 1/2000 | Balder | B05B 15/061 118/222 |
| 6,354,552 B1 * | 3/2002 | Chiu | F16M 11/10 248/422 |
| 6,923,416 B1 * | 8/2005 | Hsieh | F16M 11/38 108/118 |
| 6,988,701 B1 * | 1/2006 | Lin | F16C 11/10 248/514 |
| 7,127,778 B2 * | 10/2006 | Salice | E05F 5/006 16/286 |
| 7,487,884 B2 * | 2/2009 | Kim | B60R 7/06 220/324 |
| 8,079,446 B2 * | 12/2011 | Nemoto | B60R 7/10 185/40 H |
| 8,186,638 B2 * | 5/2012 | Nishida | B60R 7/08 224/313 |
| 2006/0016945 A1 | 1/2006 | Taylor | |
| 2006/0215073 A1 * | 9/2006 | Liao | F16M 11/08 349/58 |
| 2006/0285915 A1 * | 12/2006 | Dellach | F16C 11/10 403/92 |
| 2009/0096941 A1 * | 4/2009 | Chen | B60R 11/0235 348/837 |
| 2009/0189048 A1 * | 7/2009 | Gan | F16M 11/24 248/422 |
| 2010/0206109 A1 * | 8/2010 | Kissel | B60R 11/0235 74/333 |
| 2011/0279962 A1 * | 11/2011 | Chiang | F16M 11/105 361/679.21 |
| 2012/0037777 A1 * | 2/2012 | Nagao | F16M 11/10 248/292.12 |
| 2012/0308222 A1 * | 12/2012 | Yu | G03B 17/561 396/427 |
| 2013/0134266 A1 * | 5/2013 | Lai | A47G 23/0225 248/104 |
| 2013/0271901 A1 * | 10/2013 | Lin | H05K 5/0226 361/679.01 |
| 2015/0000436 A1 * | 1/2015 | Zhang | F16M 11/2021 74/89.16 |

FOREIGN PATENT DOCUMENTS

| | | |
|---|---|---|
| CN | 201723931 U | 1/2011 |
| JP | 2000-259085 A | 9/2000 |
| TW | 404638 | 5/1988 |
| TW | 241702 | 8/2004 |
| TW | M281204 | 11/2005 |
| TW | M328760 | 3/2008 |
| TW | 200839678 | 10/2008 |
| TW | M371250 U1 | 12/2009 |
| TW | 201137491 A1 | 11/2011 |
| TW | 201303194 A1 | 1/2013 |
| TW | M450953 U1 | 4/2013 |

* cited by examiner

SUPPORT DEVICE

FIELD

The present disclosure is related to support devices, and more particularly to a support device for an electronic device.

BACKGROUND

A support device can be independently supported electronic devices, such as mobile phones, tablet computers, and personal digital assistants (PDAS). The support device is capable of rotating to adjust certain viewing angles of the electronic device.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to; it specifically indicates open-ended inclusion or membership in the so-described combination, group, series and the like.

The present disclosure is described in relation to a support device configured to support an electronic device.

Figure 1:
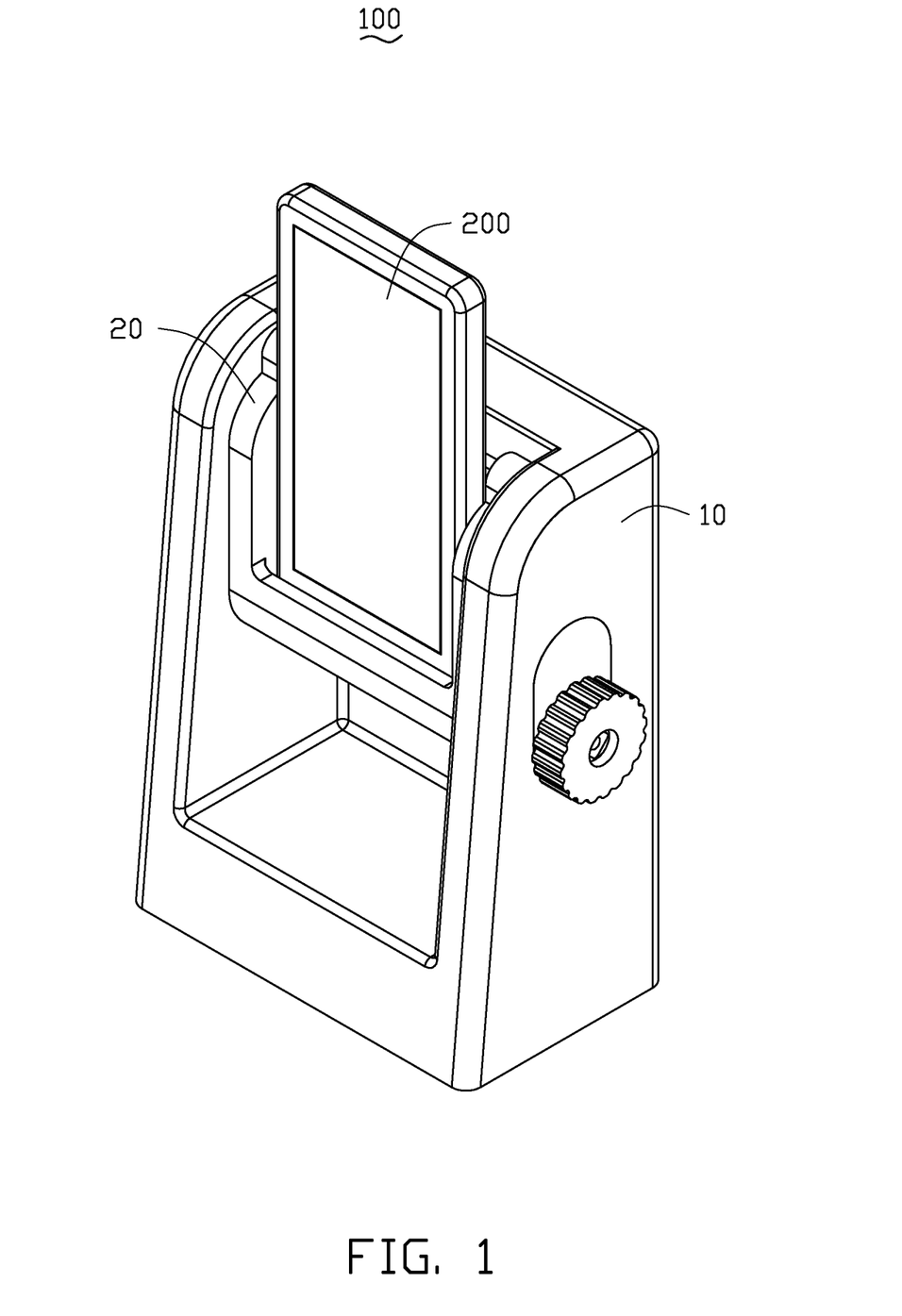
FIG. 1 is an isometric view of a support device in accordance with an embodiment of the presently described disclosure.
Figure 2:
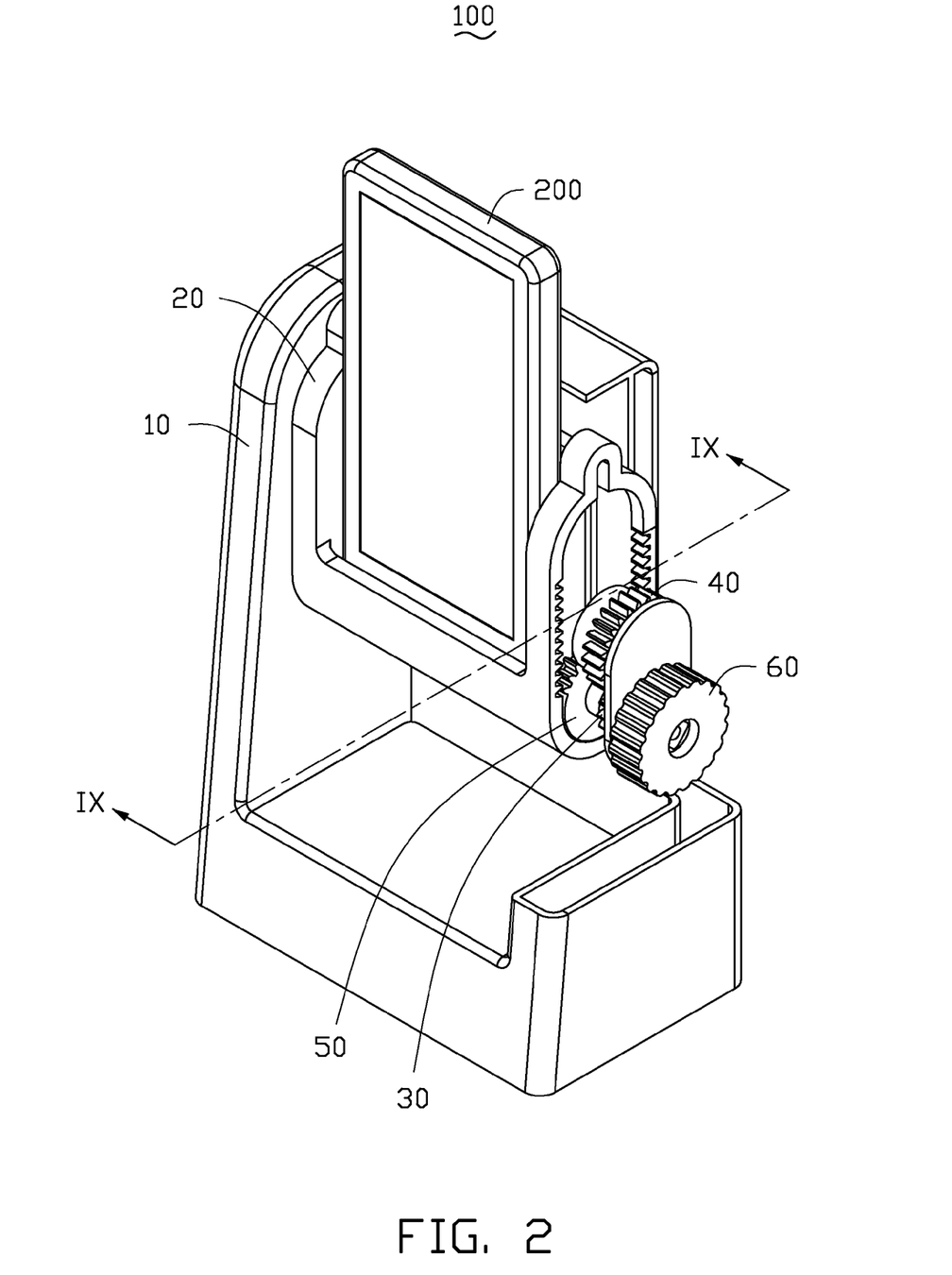
FIG. 2 is an isometric view of the support device in FIG. 1.

FIGS. 1 and 2 illustrate a support device 100 is configured to support an electronic device 200 such as a phone, a camera, a tablet computer. The support device 100 includes a base 10, a holder 20, a wheel module 30, an eccentric gear 40, a semi-gear 50, and a rotating module 60. The holder 20 is mounted to the base 10. The eccentric gear 40 and the semi-gear 50 are driven by the rotating module 60 to enable the holder 20 to move up and down or rotate relative to the base 10, to adjust a height and an angle of the holder 20 relative to the base 10.

Figure 3:
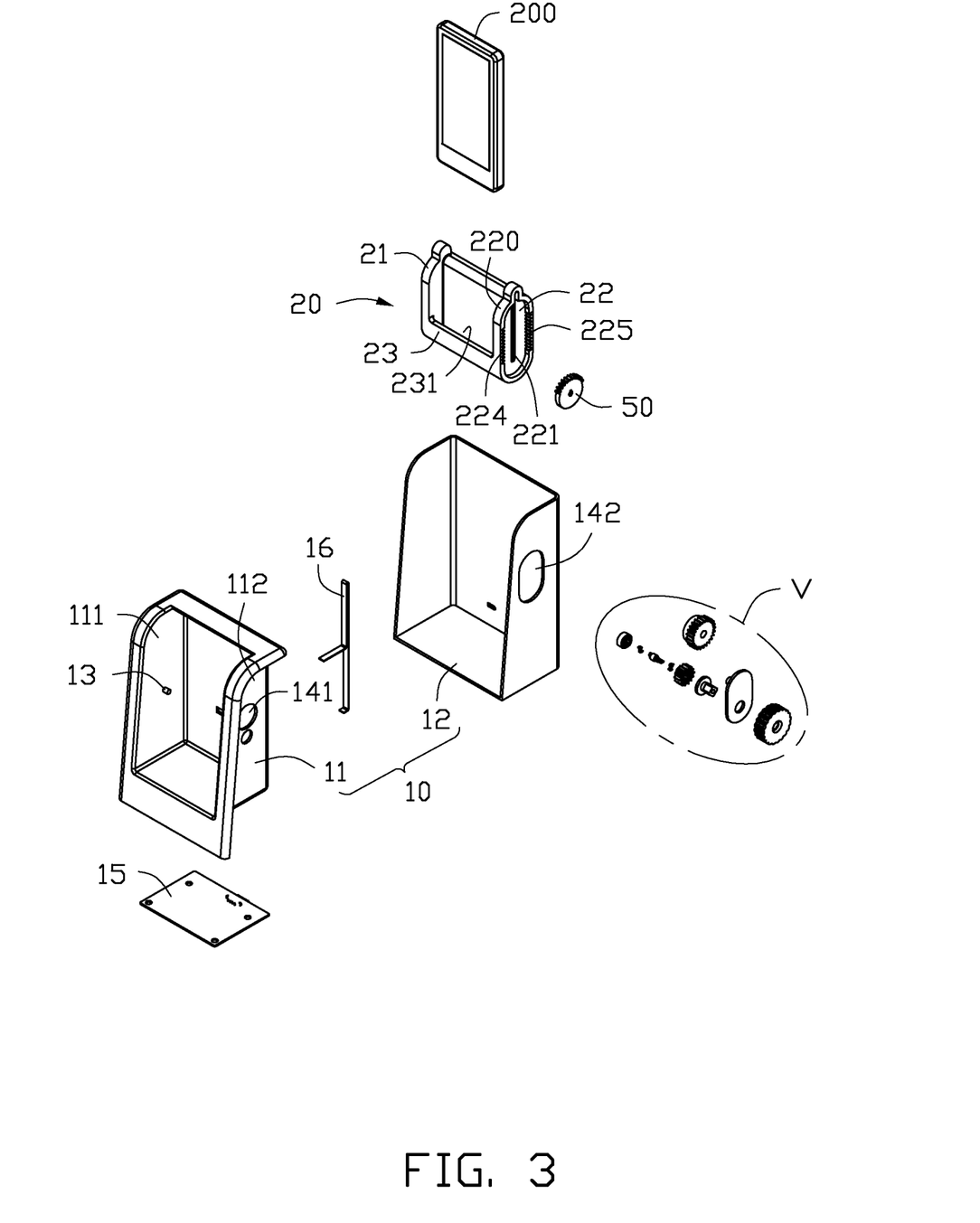
FIG. 3 is an exploded view of the support device in FIG. 1.
Figure 4:
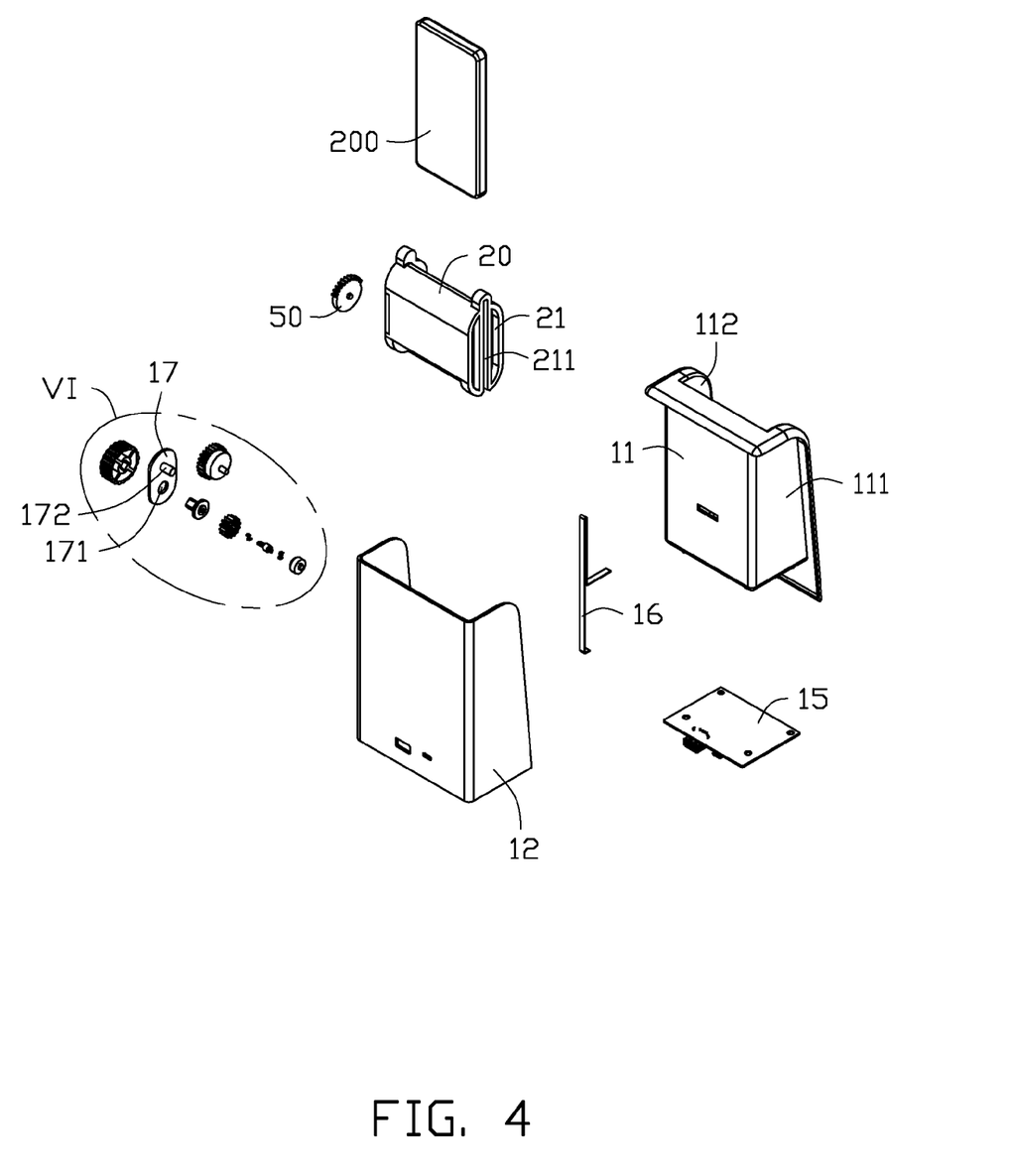
FIG. 4 is another exploded view of the support device in FIG. 1.

FIGS. 3 to 4 illustrate that in the embodiment, the base 10 includes a first shell 11, a second shell 12 assembled to the first shell 11, and a support shaft 13 positioned in the first shell 11. The first shell 11 includes a first wall 111 and a second wall 112 facing the first wall 111. The support shaft 13 protrudes from the first wall 111 towards the second wall 112. The second wall 112 defines a first hole 141 corresponding to the support shaft 13. The second shell 12 defines a second hole 142 corresponding to the first hole 141. In the embodiment, the base 10 further includes a circuit board 15, a cable 16 and a cover 17. The circuit board 15 and the cable 16 are located between the first shell 11 and the second shell 12. The cover 17 is covering the second hole 142. The cover 17 defines an installation hole 171 to receive the rotating module 60. A support post 172 protrudes from the cover 17 adjacent to the installation hole 171. When the cover 17 is covering the second hole 142, the supporting post 172 is inserted into the first shell 11 through the second hole 142 and the first hole 141.

The holder 20 includes a base board 23, a first side board 21, and a second side board 22 opposite to the first side board 21. The base board 23 defines a receiving groove 231 for receiving the electronic device 200. The first side board 21 and the second side board 22 are coupled to two opposite sides of the base board 23, and facing each other. The first side board 21 defines a first groove 211 accommodating the support shaft 13. The second side board 22 is an ellipse. The second side board 22 defines a second groove 221. A flange 220 perpendicularly protrudes from a side of the second side board 22 away from the first side board 21. Two teeth portions 224, 225 are located at two opposite surfaces of the flange 220, which are parallel to the second groove 221. The teeth portions 224 and 225 include a plurality of tabs projecting from the opposite surfaces of the flange 220.

Figure 5:
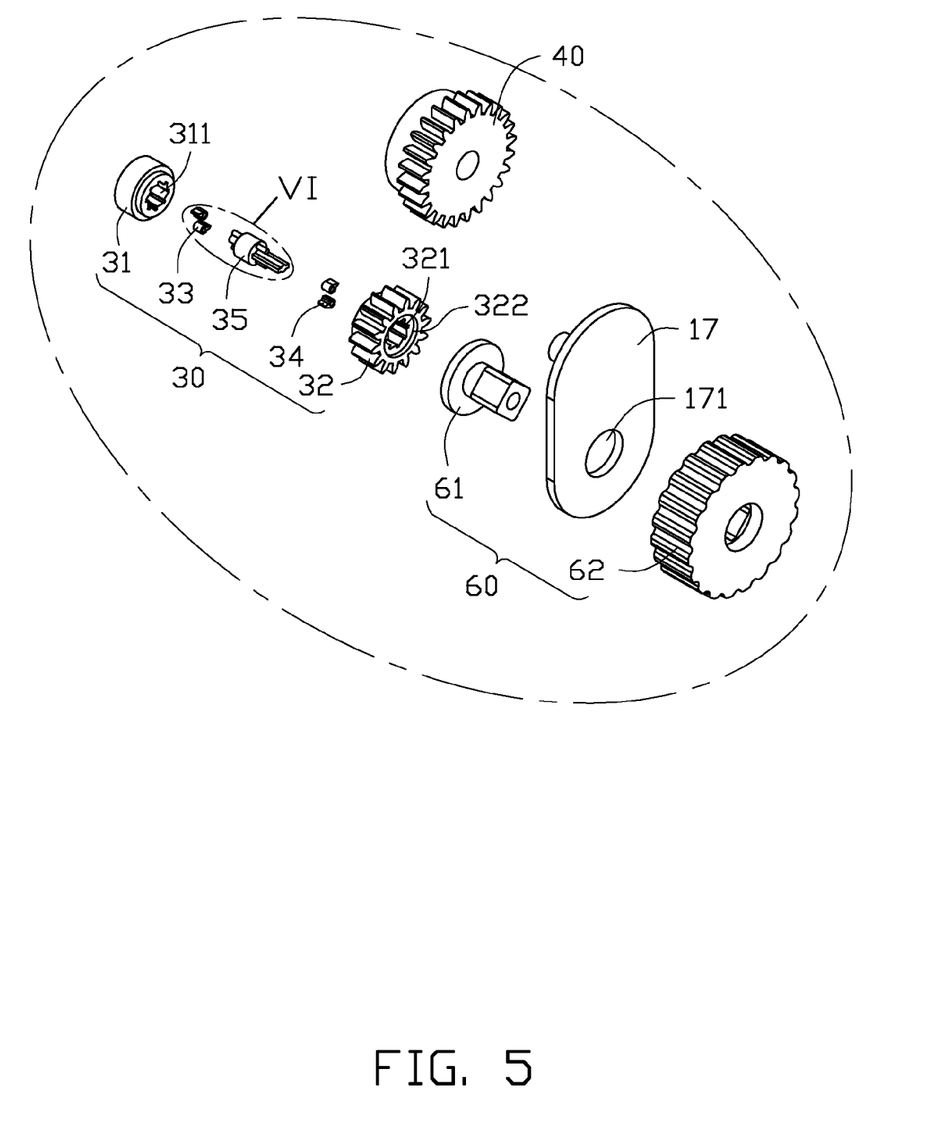
FIG. 5 is an enlarged view of circled portion V of the support device in FIG. 3.
Figure 6:
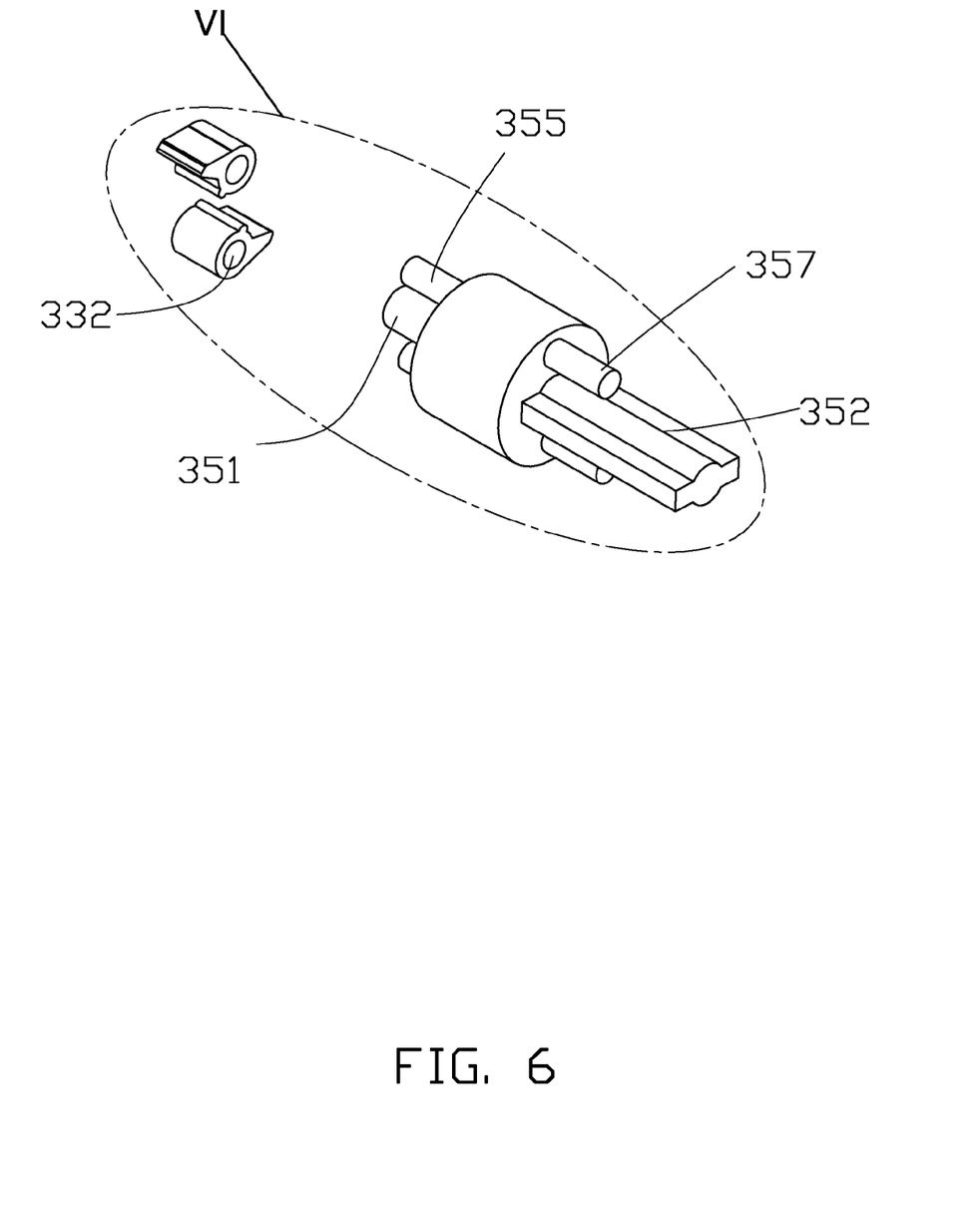
FIG. 6 is an enlarged view of circled portion VI of the support device in FIG. 5.
Figure 7:
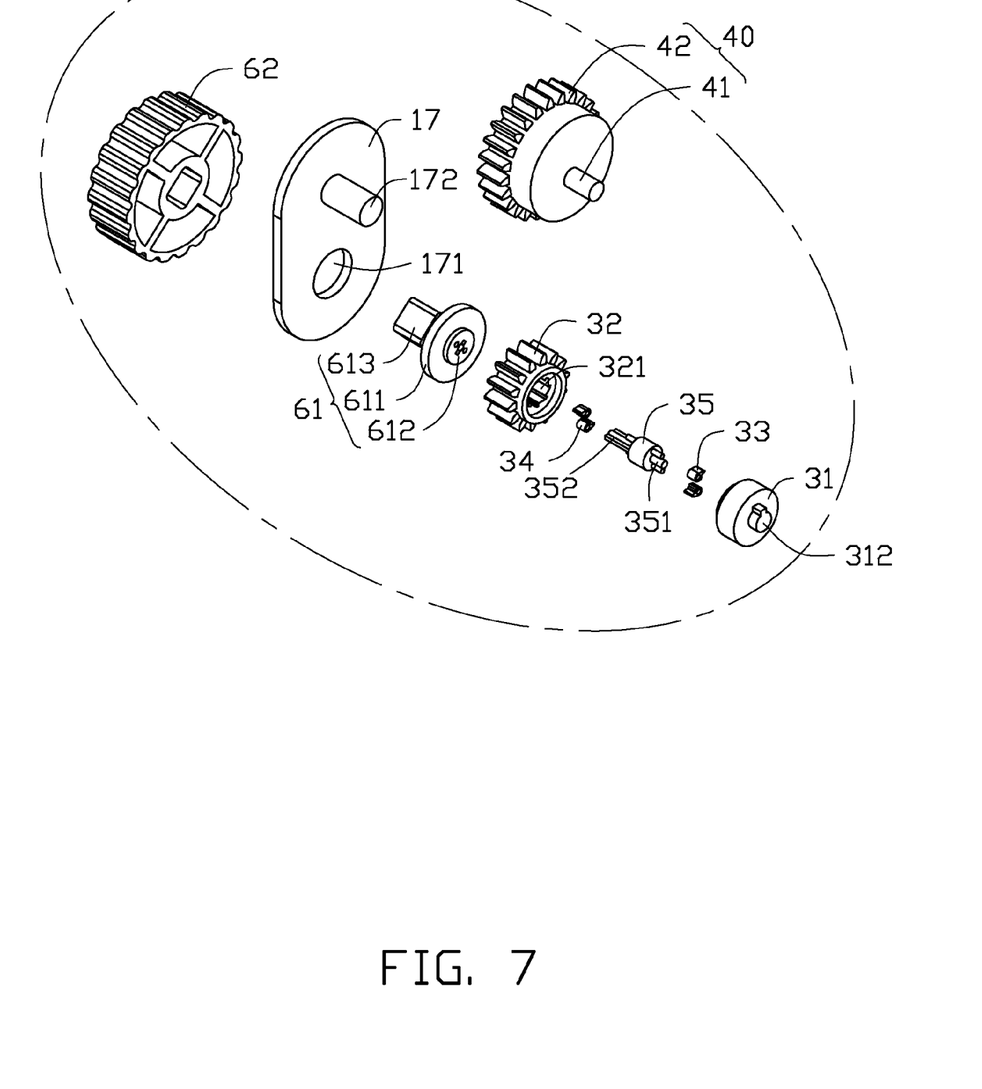
FIG. 7 is an inverted view the support device in FIG. 5.

FIGS. 5-7 illustrate that the eccentric gear 40 fixed on the support post 172 includes a shaft 41 passing through the second groove 221, and a plurality of first teeth 42 surrounding the support post 172. The eccentric gear 40 is eccentric relative to the shaft 41.

Figure 8:
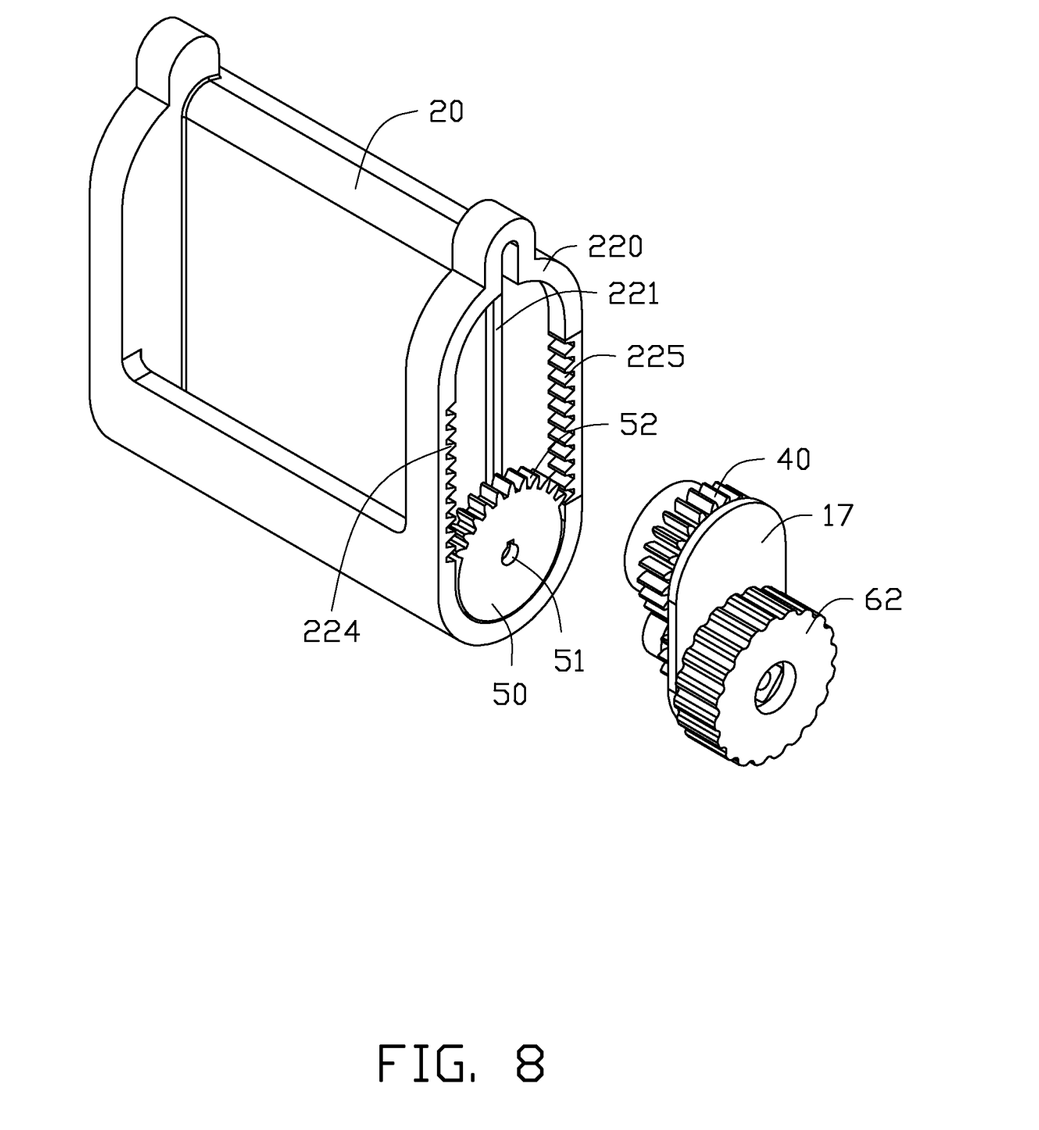
FIG. 8 is an exploded view of a part of the support device in FIG. 1.
Figure 9:
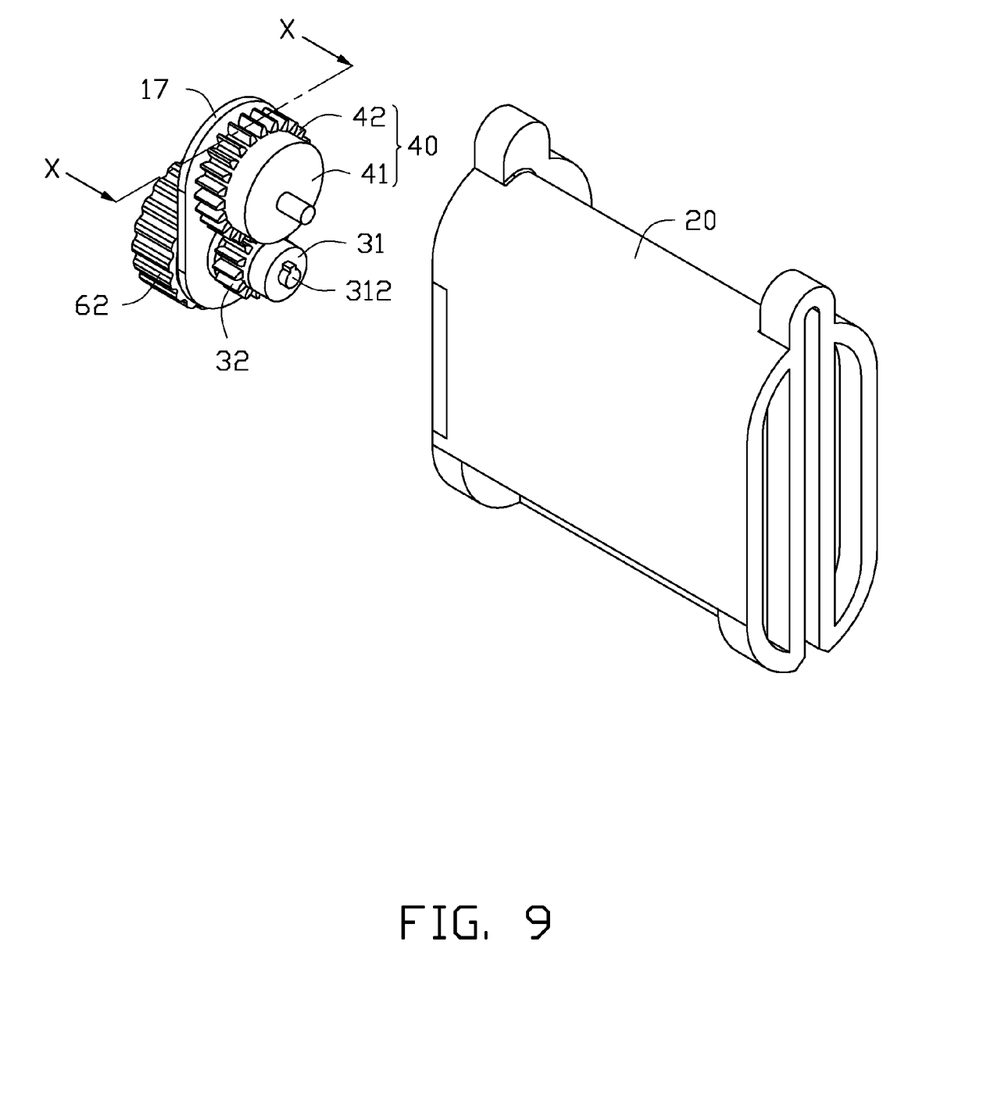
FIG. 9 is inverted view of the support device in FIG. 7.

FIGS. 7-8 illustrate that the semi-gear 50 is received in the flange 220 and positioned at an end of the flange 220. In the embodiment, the middle of the semi-gear 50 defines a fixing hole 51, and a top portion of the semi-gear 50 defines a plurality of second teeth 52 engaged with the teeth portions 224,225.

FIGS. 5-7 illustrate that the wheel module 30 includes a first ratchet wheel 31, a second ratchet wheel 32, a first detent 33, a second detent 34, and a ratchet shaft 35. A plurality of first ratchet teeth 311 protrude from an inner surface of the first ratchet wheel 31. The first ratchet teeth 311 are arranged clockwise A. A knob 312 protrudes from the surface of the first ratchet wheel 31 away from the first ratchet teeth 311. The shape of the knob 312 is same as the shape of the fixing hole 51 of the semi-gear 50. The knob 312 is inserted into the fixing hole 51 to fix the semi-gear 50, thus, the first ratchet wheel 31 can drive the semi-gear 50 to rotate when being rotated.

FIGS. 5-7 and 9-10 illustrate that a plurality of second ratchet teeth 321 protrude from an inner surface of the second ratchet wheel 32. The second ratchet teeth 321 are arranged counterclockwise B, an arranged direction of the second ratchet teeth 321 is contrary to the arranged direction of the first ratchet teeth 311. A circle recess 322 is concave from a surface of the second ratchet wheel 32 away from the first ratchet wheel 31. The second ratchet wheel 32 is engaged with the first teeth 42 of the eccentric gear 40.

Figure 10:
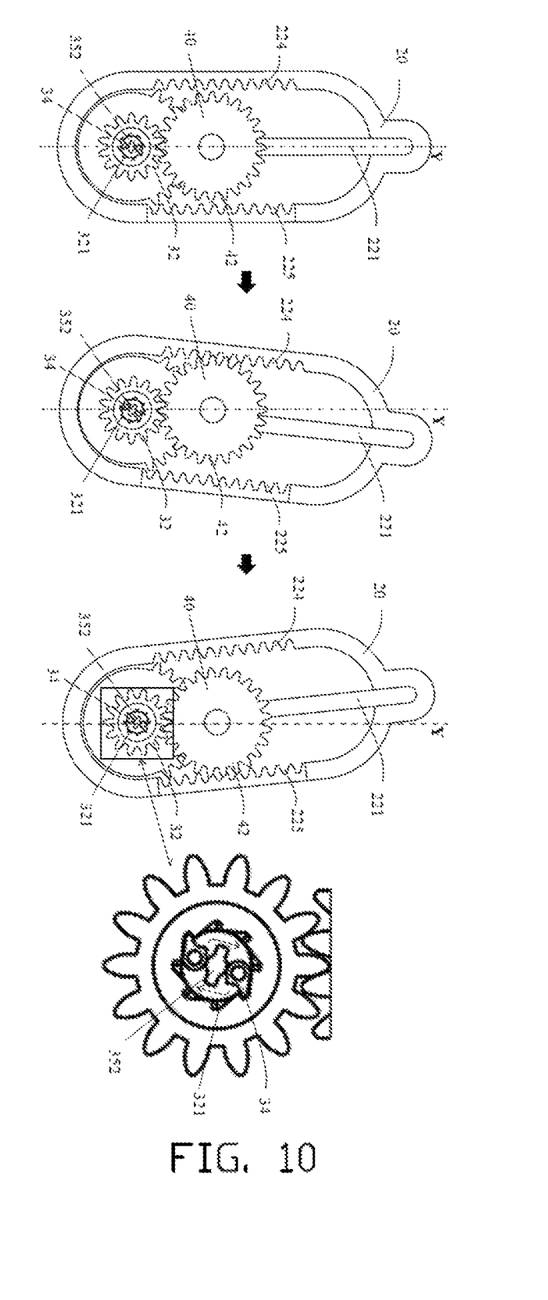
FIG. 10 is a rotating module rotated in clockwise step by step in a first view.
Figure 11:
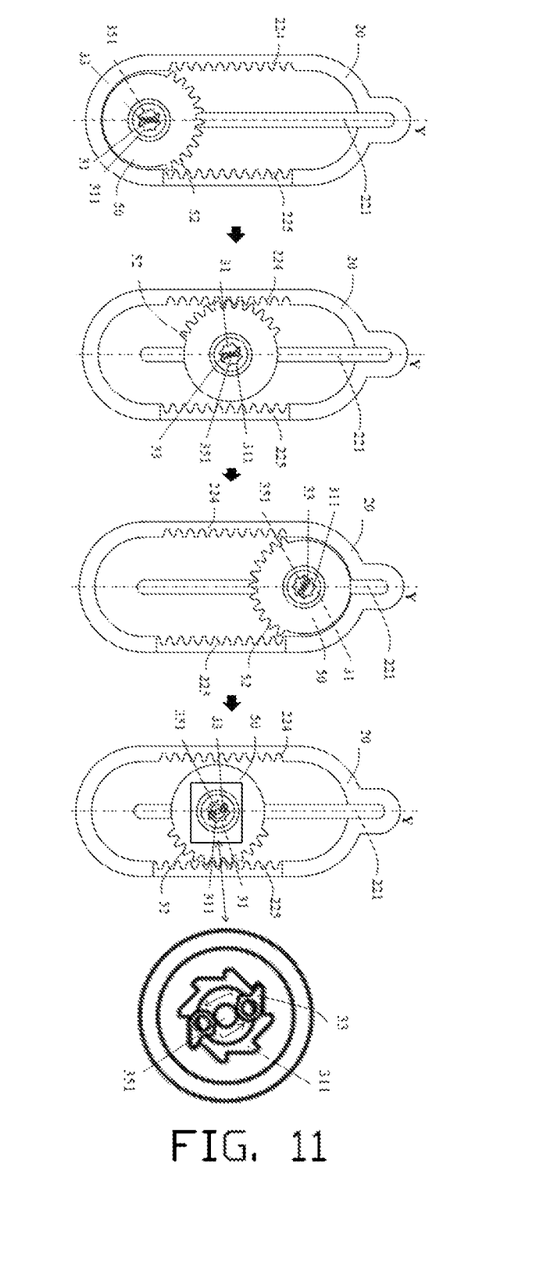
FIG. 11 is the rotating module rotated in counterclockwise in a second view.
Figure 12:
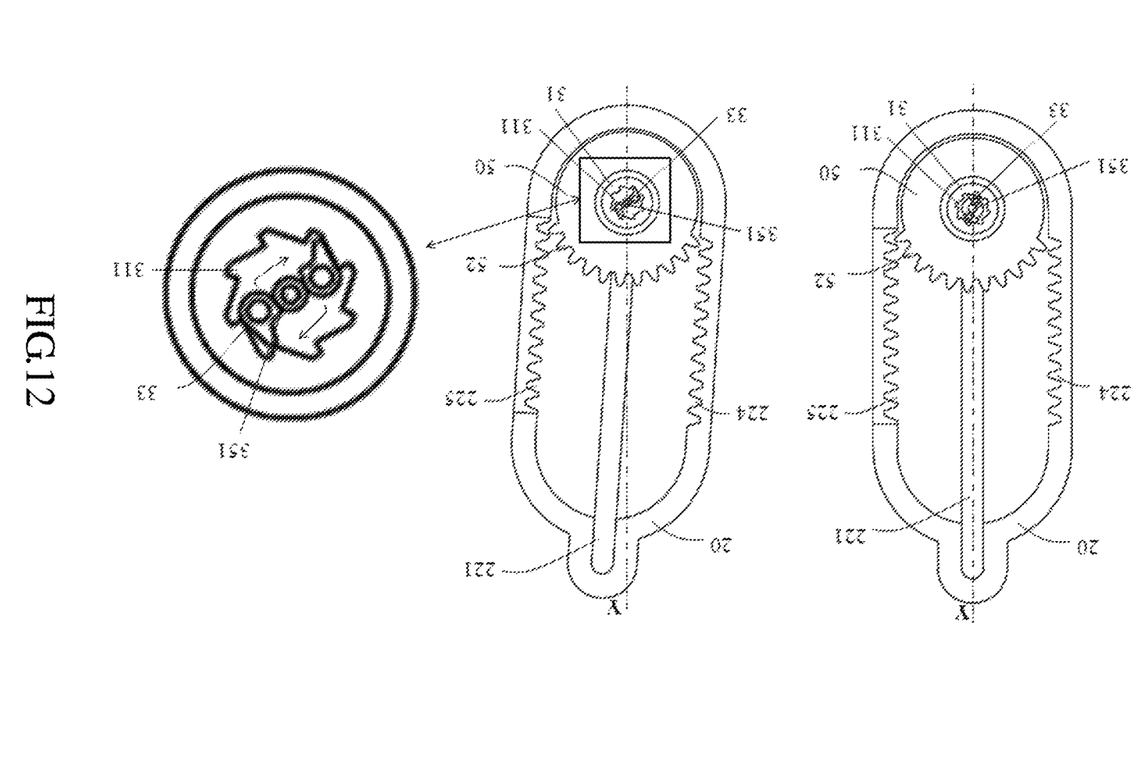
FIG. 12 is the rotating module rotated in clockwise in the second view.
Figure 13:
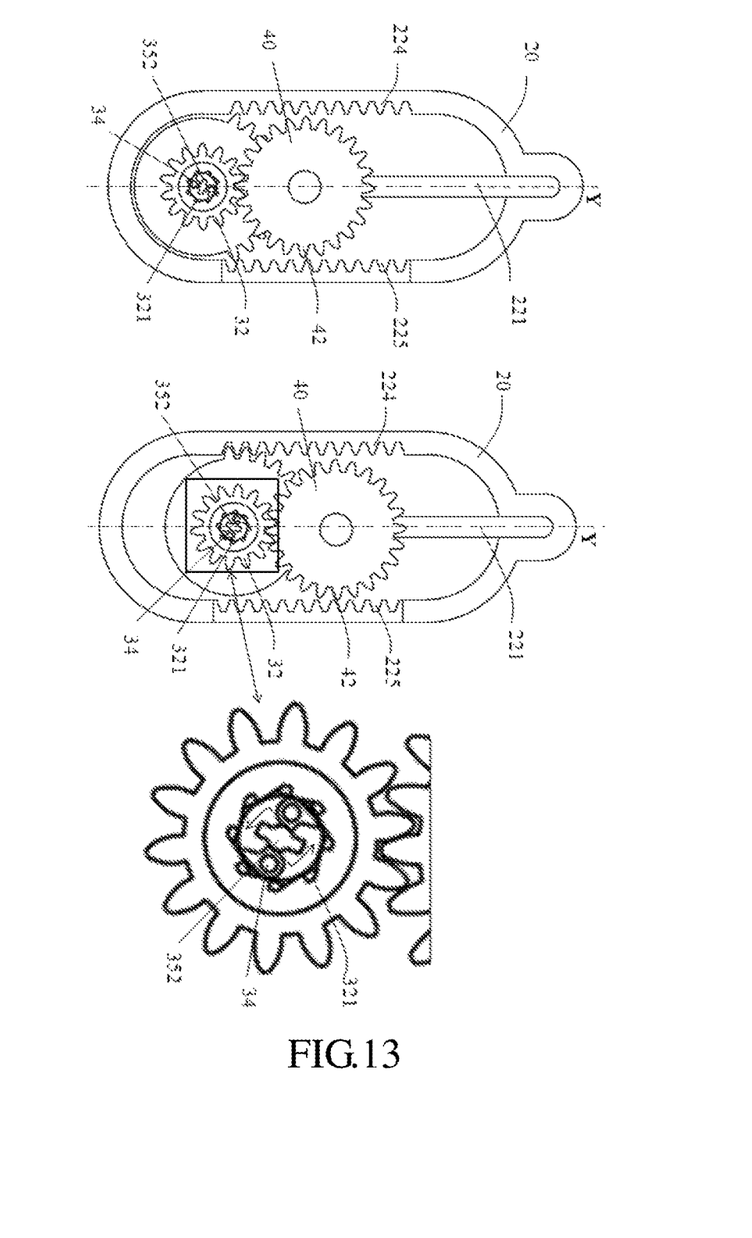
FIG. 13 is the rotating module rotated in counterclockwise in the first view.

Referring to FIG. 10 and FIG. 12, in this embodiment, the number of the first detents 33 and the number of the second detents 34 are both two. One end of each of the first detents 33 and the second detents 34 defines a hole 332. A first bearing 351 and a second bearing 352 protrude from two opposite surfaces of the ratchet shaft 35, respectively. Two first fixing shafts 355 are located at two sides of the first bearing 351 and two second fixing shafts 357 located at two sides of the second bearing 352. Two first fixing shafts 355 pass through the two holes 332 and sleeve on the first fixing shafts 335. The first fixing shafts 355 with the first detents 33 are inserted into the first ratchet teeth 311. The first bearing 351 is located between two first detents 33. One end of the first detent 33 away from the first bearing 351 is positioned between two adjacent first ratchet teeth 311. Referring to FIG. 6 and FIG. 10-FIG. 12. When the ratchet shaft 35 is rotated clockwise, the two first detents 33 rotate clockwise. When the ratchet shaft 35 is rotated counterclockwise, the two first detents 33 resist two adjacent first ratchet teeth 311 to rotate the first ratchet wheel 31 along with the ratchet shaft 35.

Two second fixing shafts 357 pass through the two holes 332 of the two second detents 34, and are inserted into the second ratchet teeth 321. The second bearing 352 is located between the two second detents 34. One end of the second detent 34 away from the second bearing 352 is positioned between two adjacent second ratchet teeth 321. Referring t FIG. 6 and FIG. 10-FIG. 12. When the ratchet shaft 35 is rotated clockwise, two second detents 34 resist between two adjacent second ratchet teeth 321 of the second ratchet wheel 32, the second ratchet wheel 32 rotates along with the ratchet shaft 35. When the ratchet shaft 35 is rotated counterclockwise, the two second detents 34 rotate along with the ratchet shaft 35. Thus, the ratchet shaft 35 cannot rotate the second ratchet wheel 32.

FIGS. 5-7 illustrate that the rotating module 60 includes a rotating shaft 61 and a controlling portion 62. The rotating shaft 61 includes a head portion 611, a fixing portion 612 protruding from the a surface of the head portion 611, and a shaft portion 613 protruding from an opposite surface of the head portion 611. The fixing portion 612 is located in the circle recess 322 of the second ratchet wheel 32. The second bearing 352 of the ratchet shaft 35 is inserted and is fixed on the fixing portion 612. The shaft portion 613 is passed through the installation hole 171 of the cover 17 and is inserted into the controlling portion 62. When the controlling portion 62 is rotated, the rotating shaft 61 is rotated which, in turn, rotates the ratchet shaft 35.

In assembly, the first shell 11 is fixed on the second shell 12, the holder 20 is mounted on the first shell 11 for supporting the electronic device 200. The support shaft 13 is inserted into the first groove 211 of the holder 20. The holder 20 is capable of moving upward or downward or rotating relative to the first shell 11. The semi-gear 50 is located in the second side board 22 and engaged with the two teeth portions 224, 225. The knob 312 of the first ratchet wheel module 30 is inserted into the fixing hole 51 of the semi-gear 50. The shaft 41 of the eccentric gear 40 is inserted into the second groove 221 of the holder 20. The second ratchet wheel 32 meshes with the eccentric gear 40. The cover 17 is located in the second hole 142. The shaft portion 613 of the rotating shaft 61 passes through the installation hole 171 and is fixed on the controlling portion 62. The fixing portion 612 is located in the circle recess 322 and is received the second bearing 352. The assembly is then complete.

Referring to FIG. 10 to FIG. 12. In use, the electronic device 200 is located in the receiving groove 231 of the holder 20. When the controlling portion 62 is rotated clockwise, the rotating shaft 61 rotates clockwise along with the controlling portion 62 and rotates the ratchet shaft 35. One end of the second detent 34 away from the second bearing 352 resists two adjacent second ratchet teeth 321. Thus, the second ratchet wheel 32 rotates clockwise along with the ratchet shaft 35 to rotate the eccentric gear 40. The shaft 41 of the eccentric gear 40 is received in the second groove 221 drives the holder 20 to shake and move at an angle. When the controlling portion 62 is rotated counterclockwise, the rotating shaft 61 rotates counterclockwise along with the controlling portion 62 and rotates the ratchet shaft 35. One end of the first detent 33 away from the first bearing 351 resists two adjacent first ratchet teeth 311. Thus, the first ratchet wheel 31 rotates counterclockwise along with ratchet shaft 35 to rotate the semi-gear 50, and the semi-gear 50 rotates the holder 20 upward or downward adjusting the height of the electronic device 200.

The embodiments shown and described above are only examples. Many details are often found in the art such as the other features of a support device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:
1. A support device for supporting an electronic device, the support device comprising:
a base;
a holder rotatably mounted to the base for holding an electronic device;
a wheel module comprising a first ratchet wheel, a second ratchet wheel, and a ratchet shaft coupled to the first ratchet wheel and the second ratchet wheel;
an eccentric gear configured to engage with the second ratchet wheel and comprising a shaft inserted into the holder;

a semi-gear configured to engage with the holder and coupled to the first ratchet wheel; and a rotating module fixed to the ratchet shaft;

wherein when the rotating module is rotated in a first direction, the first ratchet wheel is driven to rotate to drive the semi-gear to rotate, so as to make the holder to move up and down with respect to the base; and when the rotating module is rotated in a second direction reversed to the first direction, the second ratchet wheel is driven to rotate to drive the eccentric gear to rotate, so as to drive the holder to rotate with respect to the base.

2. The support device of claim 1, wherein a first fixing shaft and a second fixing shaft extending from opposite ends of the ratchet shaft, a first detent is rotatably fixed on the first fixing shaft, a second detent is rotatably fixed on the second fixing shaft, the first detent is inserted in the first ratchet wheel to drive the first ratchet wheel to rotate, and the second detent is inserted in the second ratchet wheel to drive the second ratchet wheel to rotate.

3. The support device of claim 2, wherein the ratchet shaft defines a first bearing adjacent the first fixing shaft and a second bearing adjacent the second fixing shaft, an end of the second bearing is passed through the second ratchet wheel and is fixed on the rotating module.

4. The support device of claim 3, wherein the first ratchet wheel comprises first ratchet teeth corresponding to the first detent, the second ratchet wheel comprises second ratchet teeth corresponding to the second detent, when the rotating module is rotated in the first direction, the first ratchet teeth is engaged with the first detent, the second ratchet teeth is disengaged from the second detent; when the rotating module is rotated in the second direction, the first ratchet teeth is disengaged from the first detent, and the second ratchet teeth is engaged with the second detent.

5. The support device of claim 4, wherein when the rotating module is rotated in the first direction, the ratchet shaft is rotated in the first direction to take the first detent and the second detent to rotate in the first direction, and the first detent is resisted by two adjacent first ratchet teeth to drive the first ratchet wheel to rotate, when the rotating module is rotated in the second direction, the ratchet shaft is rotated in the second direction to take the first detent and the second detent to rotate in the second direction, the second detent is resisted by the two adjacent second ratchet teeth to drive the second ratchet wheel to rotate.

6. The support device of claim 5, wherein the holder comprises a first side board and a second side board opposite to the first side board, the first side board defines a first groove to mount the holder on the base, the second side board defines a second groove, the shaft of the eccentric gear is inserted in the second groove, the shaft of the eccentric gear is able to rotate relative to the holder in the second groove to drive the holder to move by an angle.

7. The support device of claim 6, wherein a flange protrudes from the second side board, the flange forms two teeth portions engaged with the semi-gear, the semi-gear is driven to rotate to drive the holder to move upward and downward.

8. The support device of claim 1, wherein the rotating module includes a rotating shaft and controlling portion, and is located at an outside of the base, the wheel module and the eccentric gear are received in the base.

9. A support device for supporting an electronic device, the support device comprising:

a base;

a holder rotatably mounted to the base for holding an electronic device;

a semi-gear engaged with the holder;

an eccentric gear comprising a shaft inserted into the holder;

a wheel module selectively to drive one of the semi-gear and the eccentric gear to rotate;

a rotating module fixed to the wheel module; wherein when the rotating module is rotated in a first direction, the wheel module drives the semi-gear to rotate, so as to make the holder to move up and down with respect to the base; when the rotating module is rotated in a second direction reversed to the first direction, the wheel module drive the eccentric gear to rotate, so as to drive the holder to rotate with respect to the base to adjust an angle between the holder and the base, wherein the wheel module comprises a first ratchet wheel engaged with the semi-gear, a second ratchet wheel engaged with the eccentric gear, and a ratchet shaft coupled to the first ratchet wheel and the second ratchet wheel.

10. The support device of claim 9, wherein a first fixing shaft and a second fixing shaft extending from opposite ends of the ratchet shaft, a first detent is rotatably fixed on the first fixing shaft, a second detent is rotatably fixed on the second fixing shaft, the first detent is inserted in the first ratchet wheel to drive the first ratchet wheel to rotate, the second detent is inserted in the second ratchet wheel to drive the second ratchet wheel to rotate.

11. The support device of claim 10, wherein the ratchet shaft defines a first bearing adjacent the first fixing shaft and a second bearing adjacent the second fixing shaft, an end of the second bearing is passed through the second ratchet wheel and be fixed on the rotating module.

12. The support device of claim 11, wherein the first ratchet wheel comprises first ratchet teeth corresponding to the first detent, the second ratchet wheel comprises second ratchet teeth corresponding to the second detent, when the rotating module is rotated in the first direction, the first ratchet teeth is engaged with the first detent, the second ratchet teeth is disengaged from the second detent; when the rotating module is rotated in the second direction, the first ratchet teeth is disengaged from the first detent, the second ratchet teeth is engaged with the second detent.

13. The support device of claim 12, wherein when the rotating module is rotated in the first direction, the ratchet shaft is rotated in the first direction to take the first detent and the second detent to rotate in the first direction, and the first detent is resisted by two adjacent first ratchet teeth to drive the first ratchet wheel to rotate, when the rotating module is rotated in the second direction, the ratchet shaft is rotated in the second direction to take the first detent and the second detent to rotate in the second direction, the second detent is resisted by the two adjacent second ratchet teeth to drive the second ratchet wheel to rotate.

14. The support device of claim 13, wherein the holder comprises a first side board and a second side board opposite to the first side board, the first side board defines a first groove to mount the holder on the base, the second side board defines a second groove, the shaft of the electric gear is inserted in the second groove, the shaft of the electric gear is able to rotate relative to the holder in the second groove to drive the holder to move by an angle.

15. The support device of claim 14, wherein a flange protrudes from the second side board, the flange forms two teeth portions engaged with the semi-gear, the semi-gear is driven to rotate to drive the holder to move upward and downward.

16. The support device of claim 15, wherein the rotating module includes a rotating shaft and controlling portion, and is located at an outside of the base, the wheel module and the eccentric gear are received in the base.

* * * * *